US010395209B2

United States Patent
Moskos et al.

(10) Patent No.: US 10,395,209 B2
(45) Date of Patent: Aug. 27, 2019

(54) AUTOMATIC CAPACITY DETECTION SYSTEMS AND METHODS

(71) Applicant: Two Rings Media Inc., Mississauga (CA)

(72) Inventors: James Moskos, Mississauga (CA); Amit Singh Monga, Toronto (CA)

(73) Assignee: Two Rings Media Inc., Mississauga (CA)

( * ) Notice: Subject to any disclaimer, the term of this patent is extended or adjusted under 35 U.S.C. 154(b) by 278 days.

(21) Appl. No.: 15/378,592

(22) Filed: Dec. 14, 2016

(65) Prior Publication Data
US 2017/0098190 A1    Apr. 6, 2017

Related U.S. Application Data

(62) Division of application No. 13/591,634, filed on Aug. 22, 2012, now abandoned.

(51) Int. Cl.
*G06Q 10/08*    (2012.01)
*G06Q 30/08*    (2012.01)

(52) U.S. Cl.
CPC ......... *G06Q 10/0833* (2013.01); *G06Q 30/08* (2013.01)

(58) Field of Classification Search
CPC ..................... G06Q 10/0833; G06Q 30/08
See application file for complete search history.

(56) References Cited

U.S. PATENT DOCUMENTS

| 5,835,377 | A | * | 11/1998 | Bush | G01S 5/0027 700/99 |
| 5,835,716 | A | * | 11/1998 | Hunt | G06Q 10/02 709/213 |
| 5,880,958 | A | * | 3/1999 | Helms | G08G 1/202 340/991 |
| 5,890,138 | A | * | 3/1999 | Godin | G06Q 20/04 705/26.3 |
| 6,035,289 | A | * | 3/2000 | Chou | G06Q 30/08 705/35 |
| 6,064,981 | A | * | 5/2000 | Barni | G06Q 10/08 705/26.3 |

(Continued)

OTHER PUBLICATIONS

Figliozzi, "Performance and Analysis of Spot Truck—load procurement Market using sequential auctions", The University of Maryland, published in 2004, all pages. (Year: 2004).*

*Primary Examiner* — Kevin H Flynn
*Assistant Examiner* — Omar Zeroual
(74) *Attorney, Agent, or Firm* — Bereskin & Parr LLP/S.E.N.C.R.L., s.r.l.

(57) ABSTRACT

The embodiments relate to an automatic capacity detection system and methods thereof. The system includes a capacity detector for continuously monitoring an area to track an available amount of capacity; a location sensor for automatically identifying a current location at which the available amount of capacity is available; a processor in remote communication with the capacity detector and the location sensor to: compare the current location of the available amount of capacity with a destination of the available amount of capacity; estimate a remaining value of the available amount of capacity based on the comparison; and assign at least some of the available amount of capacity at the remaining value to an offering party.

20 Claims, 15 Drawing Sheets

(56) References Cited

U.S. PATENT DOCUMENTS

| | | | | |
|---|---|---|---|---|
| 6,112,152 A * | 8/2000 | Tuttle | G07B 15/063 | 340/5.61 |
| 6,148,291 A * | 11/2000 | Radican | G06Q 10/08 | 705/22 |
| 6,243,691 B1 * | 6/2001 | Fisher | G06Q 30/0601 | 705/26.3 |
| 6,385,537 B2 * | 5/2002 | Gaspard, II | G01C 21/343 | 340/991 |
| 6,671,674 B1 * | 12/2003 | Anderson | G06Q 30/08 | 705/26.3 |
| 6,813,612 B1 * | 11/2004 | Rabenold | G06Q 40/04 | 705/1.1 |
| 6,937,992 B1 * | 8/2005 | Benda | G06Q 10/04 | 705/7.26 |
| 7,080,019 B1 * | 7/2006 | Hurzeler | G06Q 10/025 | 705/6 |
| 7,149,366 B1 * | 12/2006 | Sun | G01J 3/02 | 382/284 |
| 7,222,081 B1 * | 5/2007 | Sone | G06Q 10/08 | 705/333 |
| 7,265,668 B1 * | 9/2007 | Brosius | G06Q 10/08 | 340/539.22 |
| 7,353,181 B2 | 4/2008 | Nel | | |
| 7,395,237 B1 * | 7/2008 | Hall | G06Q 10/08 | 705/26.44 |
| 7,483,858 B2 * | 1/2009 | Foran | G06Q 20/02 | 705/39 |
| 7,711,629 B2 | 5/2010 | Laurent et al. | | |
| 7,720,708 B1 * | 5/2010 | Elkins, II | G06Q 30/0207 | 705/14.1 |
| 7,752,142 B2 * | 7/2010 | Bjerre | G06Q 10/0834 | 705/333 |
| 7,814,028 B2 * | 10/2010 | Podgurny | G06Q 10/08 | 705/334 |
| 7,920,967 B1 * | 4/2011 | Harris | G01C 21/3626 | 340/995.19 |
| 8,000,988 B1 * | 8/2011 | Bezanson | G06Q 10/063 | 705/7.11 |
| 8,024,234 B1 * | 9/2011 | Thomas | G06Q 10/02 | 705/26.1 |
| 8,321,258 B2 * | 11/2012 | Gottlieb | G06Q 50/30 | 340/4.6 |
| 8,548,868 B1 * | 10/2013 | Lawrence | G06Q 30/0605 | 705/26.2 |
| 8,700,500 B2 * | 4/2014 | Podgurny | G06Q 10/08 | 705/28 |
| 8,725,656 B1 * | 5/2014 | Gill | G06Q 10/101 | 705/331 |
| 2001/0025268 A1 * | 9/2001 | Hnat | G06Q 10/08 | 705/37 |
| 2002/0019760 A1 * | 2/2002 | Murakami | G06Q 10/047 | 705/7.25 |
| 2002/0055818 A1 * | 5/2002 | Gaspard, II | G01C 21/343 | 701/410 |
| 2002/0065698 A1 * | 5/2002 | Schick | B61L 27/0094 | 705/7.36 |
| 2002/0069017 A1 * | 6/2002 | Schmier | G08G 1/123 | 701/469 |
| 2002/0077876 A1 * | 6/2002 | O'Meara | G06Q 10/06 | 705/7.15 |
| 2002/0081178 A1 * | 6/2002 | Shimada | G06Q 10/08 | 414/333 |
| 2002/0082946 A1 * | 6/2002 | Morrison | G06Q 30/0643 | 705/26.3 |
| 2002/0111892 A1 * | 8/2002 | Sharp | G06Q 10/08 | 705/37 |
| 2002/0116305 A1 | 8/2002 | Abhyanker | | |
| 2002/0116318 A1 * | 8/2002 | Thomas | G06Q 10/08 | 705/37 |
| 2002/0138352 A1 * | 9/2002 | DeMaggio | G06Q 10/0631 | 705/22 |
| 2003/0014286 A1 * | 1/2003 | Cappellini | G06Q 10/02 | 705/5 |
| 2003/0036935 A1 * | 2/2003 | Nel | G06Q 10/06312 | 705/7.22 |
| 2003/0060940 A1 * | 3/2003 | Humbard | G01C 23/00 | 701/3 |
| 2003/0061155 A1 * | 3/2003 | Chin | G06Q 20/02 | 705/39 |
| 2003/0083947 A1 * | 5/2003 | Hoffman | G06Q 10/06 | 705/22 |
| 2003/0084125 A1 * | 5/2003 | Nagda | G06Q 10/08 | 709/219 |
| 2003/0225738 A1 * | 12/2003 | Ternoey | G06Q 10/02 | |
| 2004/0010578 A1 * | 1/2004 | Demetriades | G01C 21/20 | 709/223 |
| 2004/0015392 A1 * | 1/2004 | Hammel | G06Q 10/08 | 705/13 |
| 2004/0015605 A1 | 1/2004 | Demetriades et al. | | |
| 2004/0019552 A1 * | 1/2004 | Tobin | G06Q 10/087 | 705/37 |
| 2004/0068459 A1 * | 4/2004 | Goulet | G06Q 30/02 | 705/37 |
| 2004/0220821 A1 * | 11/2004 | Ericsson | G06Q 30/0601 | 705/37 |
| 2004/0239529 A1 * | 12/2004 | Tran | G01C 23/00 | 340/961 |
| 2004/0243302 A1 * | 12/2004 | Barry | G06Q 20/201 | 705/20 |
| 2005/0004819 A1 * | 1/2005 | Etzioni | G06Q 10/02 | 705/5 |
| 2005/0021346 A1 * | 1/2005 | Nadan | G06Q 10/08 | 705/37 |
| 2005/0071245 A1 * | 3/2005 | Norins, Jr. | G06Q 10/02 | 705/14.35 |
| 2005/0209913 A1 * | 9/2005 | Wied | G06Q 10/08 | 705/12 |
| 2005/0228736 A1 * | 10/2005 | Norman | G06Q 30/08 | 705/37 |
| 2006/0015396 A1 * | 1/2006 | Blomeyer | G06Q 90/00 | 705/13 |
| 2006/0116893 A1 * | 6/2006 | Carnes | G06Q 10/08 | 705/333 |
| 2006/0152347 A1 * | 7/2006 | Hofbeck | B60R 21/01534 | 340/425.5 |
| 2006/0178930 A1 * | 8/2006 | Kim | G06Q 30/02 | 705/14.13 |
| 2006/0253366 A1 * | 11/2006 | Rebibo | G06Q 30/08 | 705/37 |
| 2006/0282277 A1 * | 12/2006 | Ng | G06Q 10/08 | 705/333 |
| 2007/0078691 A1 * | 4/2007 | Wakabayashi | G06Q 10/02 | 705/5 |
| 2007/0087756 A1 * | 4/2007 | Hoffberg | G06Q 10/0631 | 455/450 |
| 2007/0156317 A1 * | 7/2007 | Breed | B60N 2/002 | 701/45 |
| 2007/0192111 A1 * | 8/2007 | Chasen | G06Q 10/08 | 705/335 |
| 2007/0193811 A1 * | 8/2007 | Breed | B60R 21/01536 | 180/271 |
| 2008/0004798 A1 * | 1/2008 | Troxler | A01K 15/023 | 702/187 |
| 2008/0068221 A1 * | 3/2008 | Park | G08G 1/092 | 340/994 |
| 2008/0270325 A1 * | 10/2008 | Podgurny | G06Q 10/08 | 705/400 |
| 2008/0275740 A1 * | 11/2008 | Kono | G06Q 10/02 | 705/5 |
| 2009/0037086 A1 * | 2/2009 | Kolb | G01C 21/3492 | 701/117 |
| 2009/0132128 A1 * | 5/2009 | Marriott | B60R 22/48 | 701/45 |
| 2009/0234564 A1 * | 9/2009 | Onishi | G06Q 10/02 | 705/5 |
| 2009/0322510 A1 * | 12/2009 | Berger | G06Q 10/08 | 340/539.1 |

(56) References Cited

U.S. PATENT DOCUMENTS

| | | | |
|---|---|---|---|
| 2010/0010840 A1* | 1/2010 | Eden | G06F 3/0481 705/5 |
| 2010/0042445 A1* | 2/2010 | Nicosia | G06Q 10/063114 705/7.15 |
| 2010/0088163 A1* | 4/2010 | Davidson | G06Q 10/08 340/425.5 |
| 2010/0116934 A1* | 5/2010 | Herzog | B64D 11/00 244/118.5 |
| 2010/0191394 A1* | 7/2010 | Villaume | G05D 1/0083 701/16 |
| 2010/0250446 A1* | 9/2010 | Mackenzie | G06Q 10/08 705/80 |
| 2010/0299177 A1* | 11/2010 | Buczkowski | G06Q 10/06 705/7.13 |
| 2010/0317420 A1* | 12/2010 | Hoffberg | G06Q 30/0207 463/1 |
| 2011/0082714 A1* | 4/2011 | Gaikwad | G06Q 10/02 705/5 |
| 2011/0130111 A1* | 6/2011 | Crandall | B60R 21/013 455/404.1 |
| 2011/0178828 A1* | 7/2011 | Hung | G06Q 10/02 705/5 |
| 2011/0202361 A1* | 8/2011 | Firminger | G06F 19/328 705/2 |
| 2012/0010913 A1* | 1/2012 | Lele | G06Q 10/02 705/5 |
| 2012/0018582 A1* | 1/2012 | Wallace | G09B 19/00 244/137.2 |
| 2012/0071151 A1* | 3/2012 | Abramson | H04L 67/12 455/418 |
| 2012/0084173 A1* | 4/2012 | Ekholm | G06Q 30/0601 705/26.4 |
| 2012/0110005 A1* | 5/2012 | Kuo | G06F 16/176 707/769 |
| 2012/0116909 A1* | 5/2012 | Saenz | G06Q 30/08 705/26.3 |
| 2012/0143615 A1* | 6/2012 | Tengler | G06Q 99/00 705/1.1 |
| 2012/0143656 A1* | 6/2012 | Murphy | G06Q 30/0207 705/14.1 |
| 2012/0158509 A1* | 6/2012 | Zivkovic | G06Q 30/0241 705/14.58 |
| 2012/0190386 A1* | 7/2012 | Anderson | G01C 15/04 455/456.3 |
| 2012/0235791 A1* | 9/2012 | Donlan | G06Q 10/08 340/10.1 |
| 2013/0046456 A1* | 2/2013 | Scofield | G01C 21/3423 701/117 |
| 2013/0138332 A1* | 5/2013 | Johnson | G06Q 10/06315 701/120 |
| 2013/0204732 A1* | 8/2013 | Moskos | G06Q 30/08 705/26.3 |
| 2013/0231858 A1* | 9/2013 | Bourne | H04W 4/023 701/439 |
| 2013/0231965 A1* | 9/2013 | Tokatly | G06Q 10/02 705/5 |
| 2013/0238523 A1* | 9/2013 | Agrawal | G06Q 40/00 705/36 R |
| 2013/0275165 A1* | 10/2013 | Udagawa | G06Q 50/14 705/5 |
| 2014/0006070 A1* | 1/2014 | Stamler | G06Q 30/08 705/5 |
| 2014/0012772 A1* | 1/2014 | Pretorius | G06Q 50/28 705/330 |
| 2014/0025407 A1* | 1/2014 | Hayek | G06Q 30/08 705/5 |
| 2014/0025524 A1* | 1/2014 | Sims | G06O 30/0639 705/26.3 |
| 2014/0122284 A1* | 5/2014 | Bockh | G06O 30/08 705/26.3 |
| 2014/0310067 A1* | 10/2014 | Ekholm | G06Q 30/0283 705/7.35 |
| 2014/0351067 A1* | 11/2014 | Tomcsik | G06Q 50/12 705/15 |
| 2014/0365393 A1* | 12/2014 | Taylor | G06Q 10/08345 705/335 |
| 2018/0174262 A1* | 6/2018 | Wilkinson | B60P 3/007 |

* cited by examiner

AUTOMATIC CAPACITY DETECTION SYSTEMS AND METHODS

CROSS-REFERENCE TO RELATED PATENT APPLICATIONS

This application is a divisional of U.S. patent application Ser. No. 13/591,634, filed on Aug. 22, 2012. The complete disclosure of U.S. patent application Ser. No. 13/591,634 is incorporated herein by reference.

FIELD

The described embodiments relate to an automatic capacity detection system, and method for providing thereof.

BACKGROUND

Cargo carriers (e.g., transport vehicles via road, rail, or air) typically are not filled to capacity when they are transporting cargo from one location to another. This may be due to various reasons. For example, a cargo carrier may be required to depart from an originating point before the cargo carrier is filled to capacity.

In traditional cargo carrier management systems, once the cargo carrier departs for their destination from an originating point, any remaining available cargo capacity on the cargo carrier cannot be sold and is wasted. At the same time, there may be potential purchasers who are willing to buy the available cargo capacity for routes in between the originating point and the destination point, even as the cargo carrier is travelling towards its destination point.

There is thus a need for improved methods and systems for conducting an electronic auction that facilitates the sale of available cargo capacity in a cargo carrier to potential purchasers who may be willing to purchase available cargo capacity as the cargo carrier is traveling towards its destination point.

SUMMARY

In some embodiments, there is provided an automatic capacity detection system. The system includes a capacity detector for continuously monitoring an area to track an available amount of capacity; a location sensor for automatically identifying a current location at which the available amount of capacity is available and transmitting the current location; a processor in remote communication with the capacity detector for receiving the available amount of capacity and the location sensor for receiving the current location, the processor operating to: compare the current location of the available amount of capacity with a destination of the available amount of capacity; estimate a remaining value of the available amount of capacity based on the comparison; and assign at least some of the available amount of capacity at the remaining value to an offering party.

In some embodiments, there is provided a method for automatically detecting capacity. The method includes continuously monitoring, by a capacity detector, an area to track an available amount of capacity; automatically identifying, by a location sensor, a current location at which the available amount of capacity is available and transmitting the current location; operating a processor in remote communication with the capacity detector and the location sensor to: compare the current location of the available amount of capacity with a destination of the available amount of capacity; estimate a remaining value of the available amount of capacity based on the comparison; and assign at least some of the available amount of capacity at the remaining value to an offering party.

The capacity detector can be selected from the group consisting of an ultrasonic sensor, a microwave sensor and a laser sensor.

BRIEF DESCRIPTION OF THE DRAWINGS

An embodiment of the present invention will now be described in detail with reference to the drawings, in which.

DESCRIPTION OF EXEMPLARY EMBODIMENTS

Figure 1:
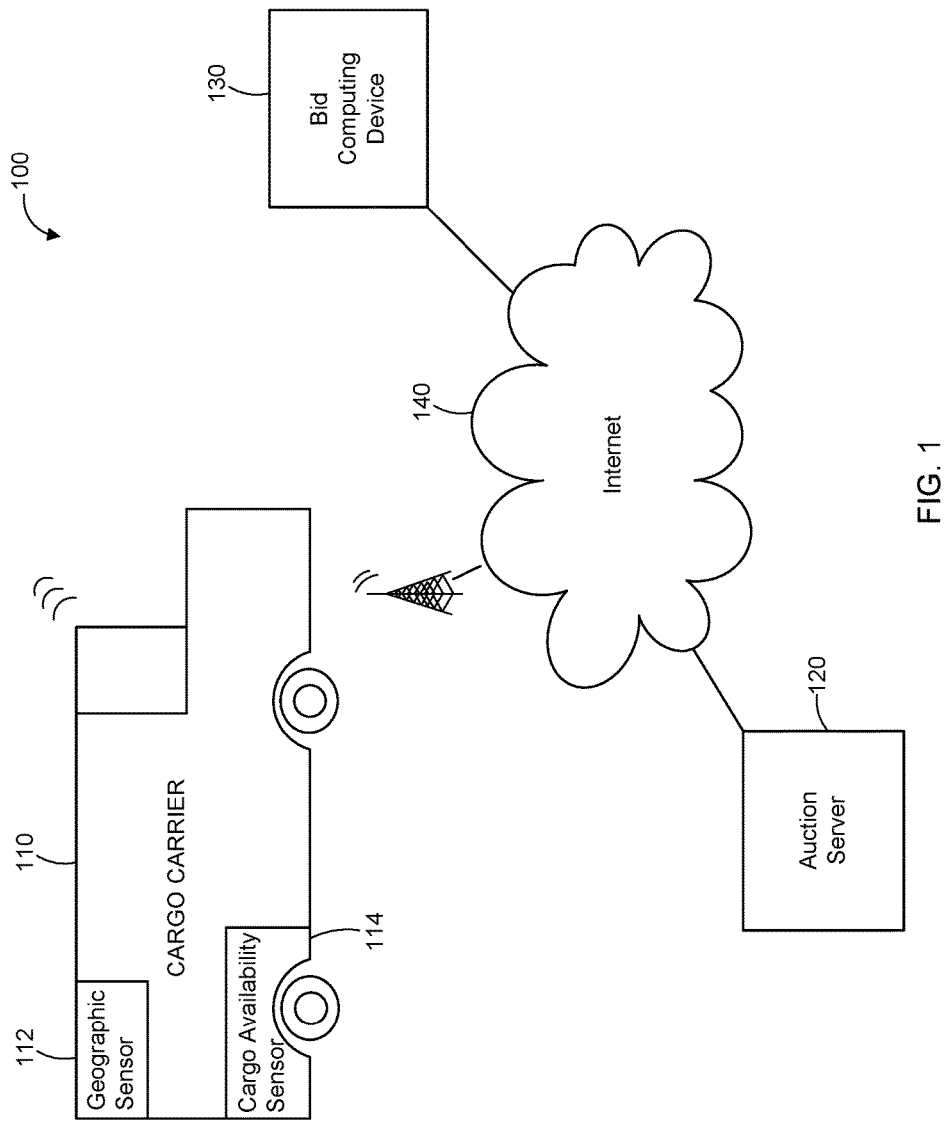
FIG. 1 is a block diagram of a system for conducting an electronic auction for available cargo capacity on a cargo carrier, in accordance with an embodiment of the present disclosure.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

Particularly, the embodiments described refer to various geographical distances, and various drawings have been provided to illustrate changes in these geographical distances. It will be understood that the drawings are not to scale, and are provided for illustration purposes only.

The embodiments of the systems and methods described herein may be implemented in hardware or software, or a combination of both. However, preferably, these embodiments are implemented in computer programs executing on programmable computers each comprising at least one processor (e.g., a microprocessor), a data storage system (including volatile and non-volatile memory and/or storage elements), at least one input device, and at least one output device. For example and without limitation, the programmable computers (e.g., the bid computing device and/or auction server discussed below) may be a personal computer, laptop, personal data assistant, cellular telephone, smart-phone device, tablet computer, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

As a cargo carrier travels towards a starting point for a route in between its originating point and destination point, the available cargo capacity on the cargo carrier may be considered to be a good of diminishing value. For example, while the cargo carrier is a far distance from the starting point for the route, the operator (e.g., the driver or conductor) of the cargo carrier may wish to maintain a high price for the cargo capacity so that the highest profit for transporting cargo on the route may be maintained. However, as the cargo carrier travels towards the starting point of the route (without the cargo capacity being purchased), the operator of the cargo carrier may be more desperate to sell the cargo capacity because the cargo capacity for that route will no longer be sellable once the cargo carrier travels past the starting point of the route. Accordingly, the operator may be willing to decrease the price for the cargo capacity for that route as the cargo carrier travels towards the starting point of the route.

In this manner, the cargo capacity for a route between an originating point and a destination point may be suitable for sale in a Dutch Auction, i.e., an auction that starts with a high asking price which is decreased until some participant is willing to accept the current price.

Reference is first made to FIG. 1, shown there generally as 100, is a block diagram of a system for conducting an electronic auction for available cargo capacity on a cargo carrier, in accordance with an embodiment of the present disclosure. The system 100 may include a cargo carrier 110, an auction server 120, and a bid computing device 130, each in communication with each other, for example via a communications network such as the Internet 140. In operation, the auction server 120 may execute an electronic auction for available cargo capacity on the cargo carrier 110 as the cargo carrier 110 is travelling from an originating point to a destination point. Potential purchasers may bid for the available cargo capacity on the cargo carrier 110 by using bid computing device 130.

The cargo carrier 110 may be provided with a geographic sensor 112 that is capable of determining the geographic location of the cargo carrier 110. For example, this may include a Global Positional System (GPS) sensor, a cellular network tower triangulation sensor, a Wi-Fi triangulation sensor, and/or any combination of one or more of these sensors. The cargo carrier 110 may also be provided with a mobile computing module (not shown) that is capable of interfacing with the geographic sensor 112 to retrieve the geographic location information and transmit it to the auction server 120. The mobile computing module may be any suitable computing device that is capable of conducting wireless communications. For example, the mobile computing module may be an off-the-shelf computing device including the geographic sensor 112 such as a smartphone or a tablet computer that stores a proprietary application for transmitting geographic information from the geographic sensor 112 to the auction server 120. Additionally or alternatively, the mobile computing module may be a custom integrated circuit (IC) including: a wireless transceiver and a processor that is programmed to transmit geographic information from the geographic sensor 112 to the auction server 120. As will be understood, additional configurations for the mobile computing module may also be possible.

In various embodiments, the cargo carrier 110 may optionally be provided with a cargo availability sensor 114 that is configured to determine the amount of cargo capacity that is available on the cargo carrier 110 at any given time. Such sensors may operate according to principles similar to that of sonar or radar; e.g., by sending wave signals and evaluating the echo that is received back from within a holding area of the cargo carrier 110 to determine the distance the sensor is to the closest cargo object. The greater the determined distance is, the emptier the holding area of the cargo carrier 110. Correspondingly, the shorter the determined distance, the fuller the holding area of the cargo carrier 110. Depending on the arrangement of the various sensors within the cargo carrier, an approximation of the volume of available cargo capacity within the cargo carrier 110 may be arrived at. Examples of such sensors that may be provided within the holding area of a cargo carrier 110 may include an ultrasonic sensor, a microwave sensor, a laser sensor, and/or any combination of one or more of these sensors. These sensors may also interface with the mobile computing module of the cargo carrier 110 so that the mobile computing module may transmit live information about the amount of cargo that is available in a given cargo carrier 110.

As will be understood, the cargo carrier 110 of the present disclosure is not limited with regards to the type of cargo that may be transported. For example, the cargo carrier 110 may transport cargo that requires specialized holding areas (e.g., holding areas that provide refrigeration, temperature control and/or pressurization).

Auction server 120 may be any suitable computing device that is configurable to run the electronic auction for the available cargo capacity of a cargo carrier 110, as provided for in the present disclosure. In various examples, the auction server 120 may be provided on a dedicated server computer, mainframe, computer cluster, or like computing resource. The auction server 120 may be configured to communicate with the mobile computing module of the cargo carrier 110 to receive the geographic location information and/or the available cargo capacity information from the cargo carrier 110. Also, the auction server 120 may be configured to allow one or more bid computing devices 130 access to the electronic auction via any suitable means of computer communications. For example, access to the electronic auction may be provided for in the form of an API or as a web interface.

The bid computing device 130 may be any suitable computing device that is configurable to access an electronic auction being run on the auction server 120. As will be understood, the bid computing device may be a desktop computer, laptop computer, a smartphone, a tablet computer, or any suitable computing device that is capable of communicating with auction server 120. In various embodiments, the application executing on the computing device 130 may be a thick or thin client which accesses Application Programming Interfaces (APIs) available on the auction server 120. Additionally or alternatively, the application on bid computing device 130 accessing the auction server 120 may be a web browser configured to access a web server that is providing access to the electronic auction running on the auction server 120. Other ways of communicating with the web server 120 to access an electronic auction may also be possible.

Internet 140 is illustrated in FIG. 1 as an example of a communications network that may facilitate communications amongst the cargo carrier 110, the auction server 120, and any number of bid computing devices 130. However, it will be understood that other that other communications networks may also be possible. For example, the communication of messages described in the current disclosure may be performed (either wholly or partially) through proprietary networks or cellular networks.

Cargo Capacity Electronic Auctions for a Route

Figure 2:
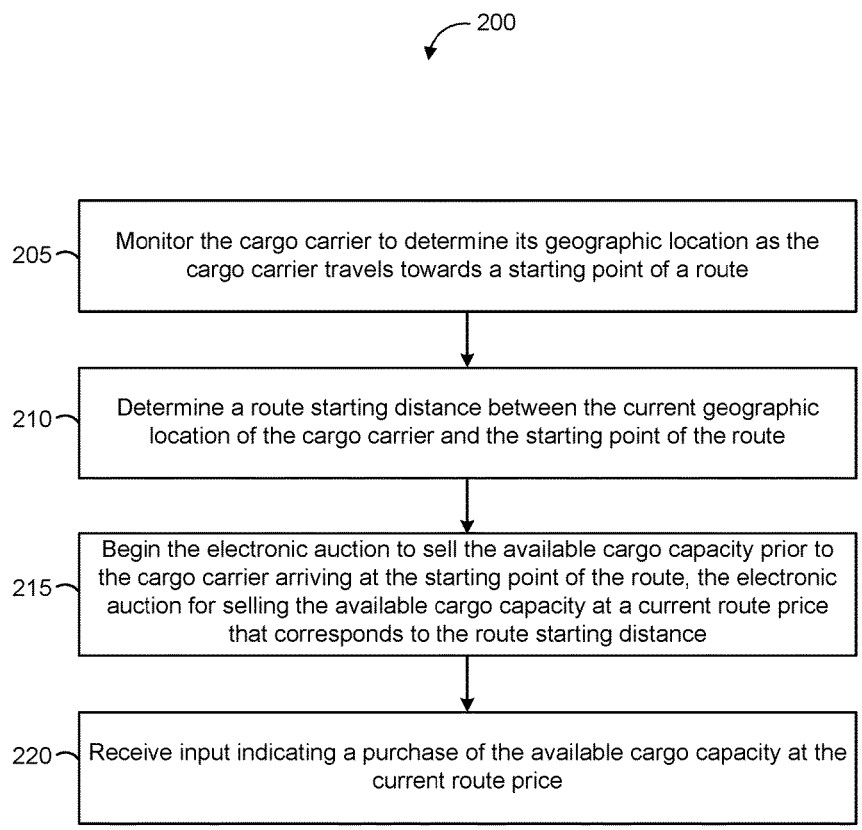
FIG. 2 is a flowchart diagram illustrating steps for conducting an electronic auction for available cargo capacity on a cargo carrier, in accordance with an embodiment of the present disclosure.

Referring to FIG. 2, illustrated there is a flowchart diagram illustrating steps of conducting an electronic auction for available cargo capacity on a cargo carrier 110, in accordance with an embodiment of the present disclosure. Some or all of these steps may be performed by a processor on auction server 120.

At step 205, the auction server 120 may monitor the cargo carrier 110 to determine its geographic location as the cargo carrier travels towards a starting point of a route that is between the cargo carrier's 110 originating point and the cargo carrier's 110 destination point. This monitoring may be performed by receiving geographic location information (as may be generated by the geographic sensor 112) transmitted by the mobile computing module of the cargo carrier 110.

At step 210, the method involves determining a route starting distance between the geographic location of the cargo carrier 110 and the starting point of the route.

Figure 3:
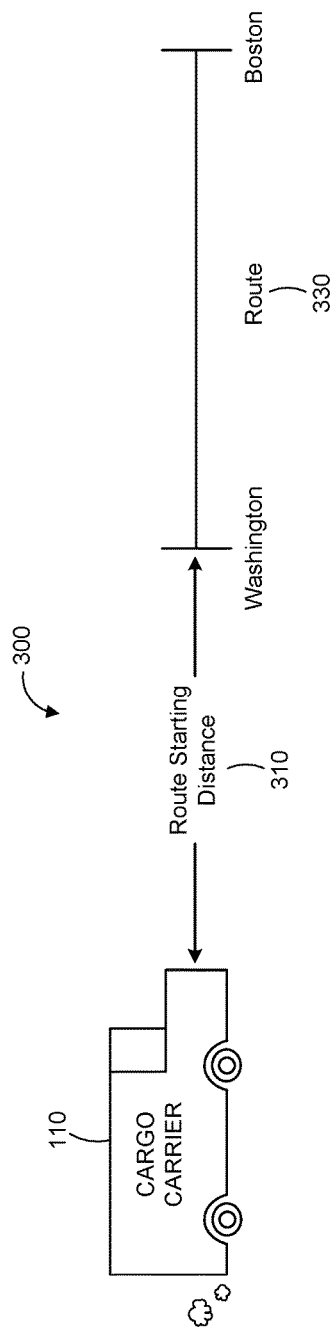
FIG. 3 is an example depiction of a cargo carrier as it travels towards the starting point of a route.

Referring simultaneously to FIG. 3, shown there generally as 300, is an example depiction of a cargo carrier 110 as it travels towards the starting point of a route 330. In the illustrated example, the cargo carrier 110 may have already departed from its originating point, and is heading towards its destination point ('Boston'). As it is travelling, a route 330 in between the originating point and the destination point ('Boston') may be identified (i.e., the route 330 with a starting point being in the city of 'Washington'). After the identification of such starting point of a route 330, a route starting distance 310 may be determined.

As will be understood, as the cargo carrier 110 is travelling towards the route starting point ('Washington'), the route starting distance 310 will generally be decreasing. However, there may be scenarios where the cargo carrier is forced to take detours that may increase the route starting distance 310.

The route starting distance 310 may be calculated in different ways in various embodiments. For example, the route starting distance may be generated from a calculation of the straight-line physical distance between the geographic location coordinates of the cargo carrier 110 and the geographic location coordinates of the route starting point ('Washington'). Additionally or alternatively, the route starting distance may be calculated by also taking into account the distance of roads or tracks (in cases where the cargo carrier 110 is a cargo truck or train, for example) that the cargo carrier 110 needs to travel before arriving at the route starting point ('Washington'). In this latter scenario, the auction server 120 may be configured to communicate with a maps database that contains road or rail data so as to allow the auction server 120 to determine such a route starting distance 310. As will be understood, roads or railway tracks may not be linear. As a result, the route starting distance 310 calculated in this latter manner may differ from a route starting distance 310 calculated by simply by determining the physical straight-line distance between geographic location coordinates of the cargo carrier 110 and the route starting point ('Washington').

As will be understood, the route starting point ('Washington') provided may be identified using any geographic location identifier. That is, although FIG. 3 illustrates an example where the geographic location identifier is a city, other geographic location identifiers may be used to identify endpoints of a route or route segment (route segments are discussed in greater detail below). For example, other geographic location identifiers may include a postal code, a postal address range, a city, a county, a province, and a state. In scenarios where the geographic location identifiers correspond to large physical areas (e.g., a city, province or state), such that the route starting point may not be readily be identified from the geographic location identifier alone, a pre-selected default location may be used for the purpose of calculating the route starting distance 310. For example, the pre-selected default location may include a city center, a famous landmark, a governmental building and/or a geographical boundary of the city, province or state, as the case may be.

At step 215, the auction server 120 may begin the electronic auction to sell the available cargo capacity prior to the cargo carrier 110 arriving at the starting point of the route. While traditional auctions are typically held over a period of time (during which the price of an item being sold varies as the time progresses), in the subject embodiments, the price for the available cargo capacity (referred to herein as a "current route price") corresponds to the route starting distance 310.

In various embodiments, the current route price may decrease as the route starting distance 310 between the geographic location of the cargo carrier 110 and the starting point of the route decreases. That is, while the current route starting distance 310 is large, the operator of the cargo carrier 110 may desire to obtain the highest possible price for the available cargo capacity. But as the cargo carrier 110 travels closer to the route starting point (e.g., as the route starting distance 310 decreases), the operator of the cargo carrier 110 may become more motivated to sell the available cargo capacity, and may accordingly lower the price. This is because the cargo capacity for the given route will no longer be sellable once the cargo carrier 110 travels past the starting point of the route, and the operator of the cargo carrier 110 would likely rather make a sale for the available cargo capacity at a lower price, than no sale at all.

Figure 4:
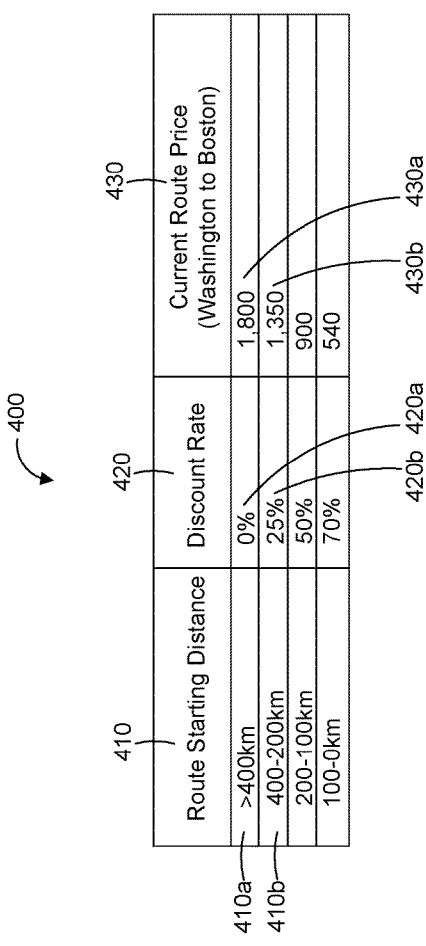
FIG. 4 is an example table showing distances that a cargo carrier needs to travel to a starting point of a route, and corresponding current route prices, in accordance with an embodiment of the present disclosure.

Referring to FIG. 4, shown there is an example table 400 illustrating distances that a cargo carrier 110 may need to travel to a starting point of a route, and corresponding current route prices, in accordance with an embodiment of the present disclosure. FIG. 4 continues on with the example shown in FIG. 3 for a cargo carrier 110 with available cargo capacity that is destined for the city of 'Boston', and is en route to the city of 'Washington'. As illustrated, column 410 contains a number of different ranges for a route starting distance 310, and column 430 shows a corresponding number of different prices for when the route starting distance 310 falls within a given distance range. In this particular example, a column 420 is provided that indicates a discount rate that may be applied to the original price of the cargo capacity as the route starting distance moves towards smaller ranges. For example, if the route starting distance 410a indicates that the cargo carrier 110 is greater than '400 km' away from 'Washington', a discount rate 420a of '0%' may be applied, and the current route price 430a may be the original price of '$1,800'. As the current cargo carrier 110 continues to travel towards the route starting point at 'Washington', the route starting distance 310 may decrease to be within the range 410b of '400-200 km'. This may result in a discount rate 420b of '25%' being applied, so that the current route price 430b is decreased to '$1,350'. As illustrated, it can be seen that the discount rate 420 may continue to increase as the route starting distance 310 decreases to fall within lower route starting distance ranges 410. The current route prices 430 may correspondingly decrease as a result.

It will be understood that column 420 (having fixed discount rates for pre-determined route starting distance ranges 410) is shown as one example method of decreasing the current route price. Other methods of generating a current route price from a route starting distance 310 may also be used. For example, some other relationships between a route starting distance 310 and a current route price may include linearly and/or exponentially decreasing mathematical functions.

At step 220, the method involves receiving input indicating a purchase of the available cargo capacity at the current route price. The input may be received from one or more bid computing device(s) 130, for example. Once the purchase of the cargo capacity for a route has been made, auction server 120 may facilitate communications between the bid computing device 130 and the operator of the cargo carrier 110, so as to allow arrangements for pickup/drop-off of the items to be transported. For example, this may involve providing the operator of the cargo carrier 110 with contact information (e.g., a phone number) for a user of the bid computing device 130. Alternatively, the auction server 120 may obtain the pickup location from the user of the bid computing device 130, and communicate it to the cargo carrier 110. Further, the auction server 120 may be able to communicate a standardized drop-off location (e.g., where the cargo carrier 110 will be stopping) to the bid computing device 130. As will be understood, other methods of arranging the pickup of items to be transported by the cargo carrier 110 may be possible.

Cargo Capacity Electronic Auctions for a Partitioned Route

As a cargo carrier 110 is travelling between an originating point and a destination point, there may be various intermediate points that may serve as the beginning of a route. The auction server 120 may be configured to start an electronic auction for any one of these intermediate routes, and in some cases, multiple auctions may be occurring for overlapping route segments at the same time. In the discussion below, these various intermediate routes may be considered to be route segments of a route that the cargo carrier 110 is travelling towards.

To illustrate the various steps of operating an electronic auction in this manner, an example scenario will be discussed below with respect to FIGS. 5 to 10C. This example builds on the example shown earlier in FIG. 3 for a cargo carrier 110 travelling towards 'Washington' and is destined for 'Boston'. Referring briefly to FIG. 6A, therein illustrated is an example depiction similar to that shown in FIG. 3, with a cargo carrier 110 travelling towards the starting point of a route ('Washington'), except that the route can be partitioned into multiple route segments using various intermediate locations ('Philadelphia' and 'New York').

The figures show the state of electronic auctions at three separate points in time. At the first point in time (illustrated in FIG. 6A and referred to as time 'A' below), the cargo carrier may be travelling towards the starting point of a route. At the second point in time (illustrated in FIG. 6B and referred to as time 'B' below), a route segment between a route starting point and the destination point may be purchased. At the third point in time (illustrated in FIG. 6C and referred to as time 'C' below), the cargo carrier 110 may have traveled past the starting point for a route.

Figure 5:
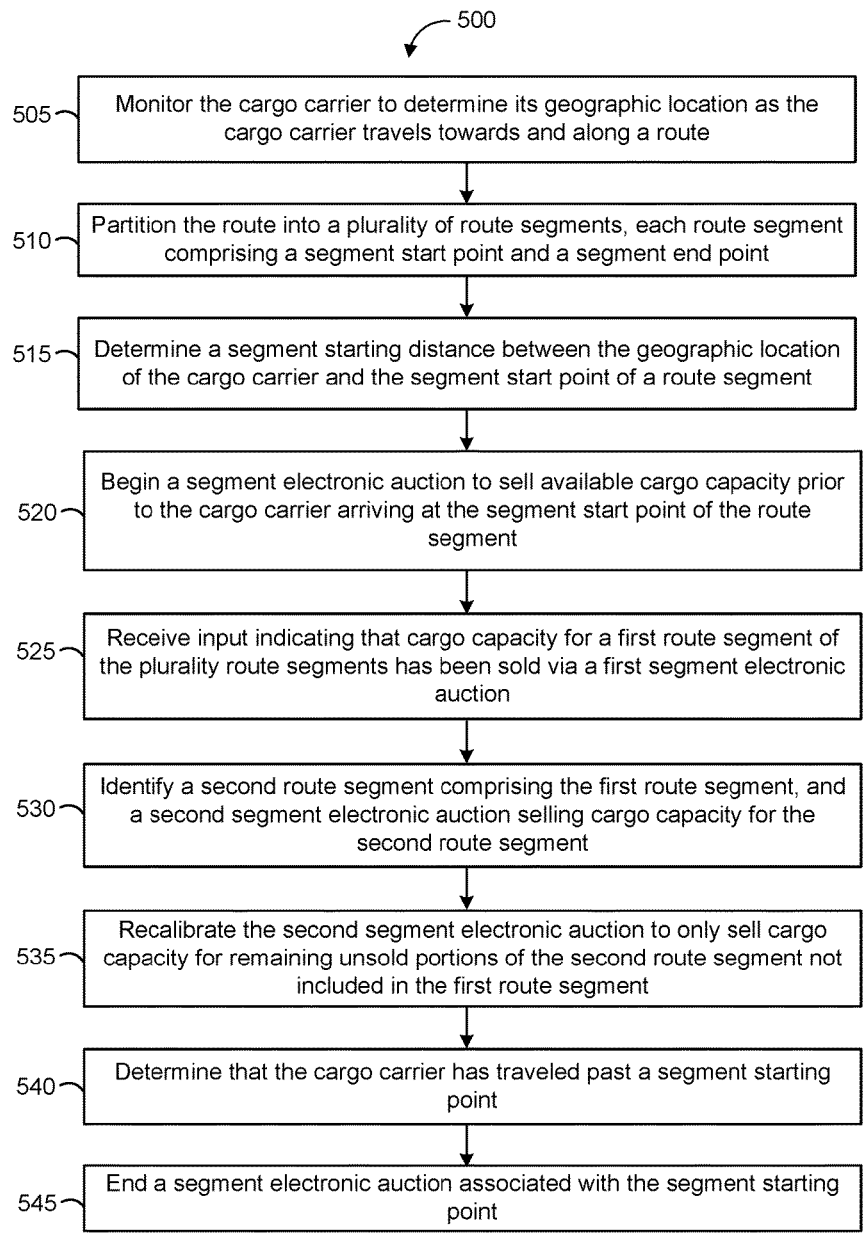
FIG. 5 is a flowchart diagram illustrating steps for conducting an electronic auction for available cargo capacity on a cargo carrier travelling towards a route that has been partitioned into a plurality of route segments, in accordance with an embodiment of the present disclosure.
Figure 6A:
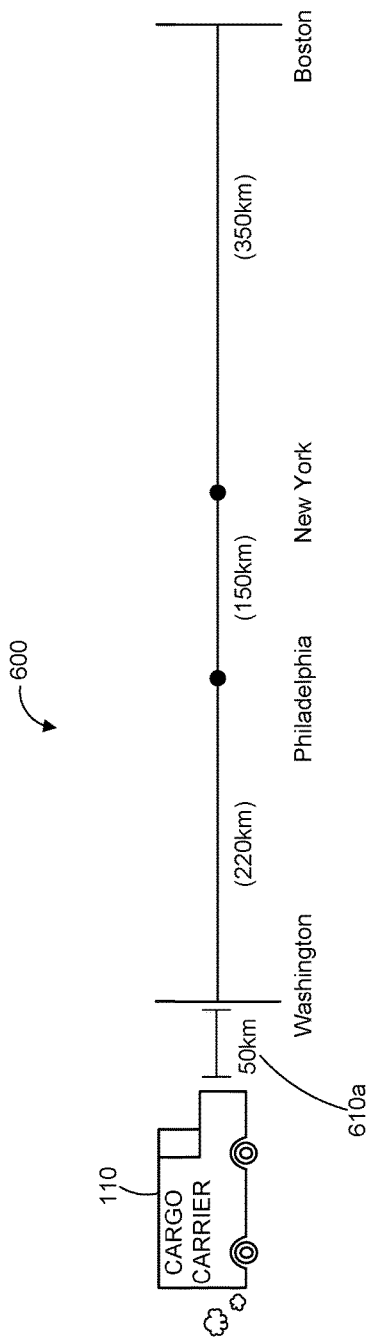
FIG. 6A is an example depiction, at first point in time 'A', of a cargo carrier as it travels towards the starting point of a route that has been partitioned into a plurality of route segments.

Referring to FIG. 5, shown there generally as 500 is a flowchart diagram illustrating steps of conducting an electronic auction for available cargo capacity on a cargo carrier 110 travelling towards a route that has been partitioned into a plurality of route segments, in accordance with an embodiment of the present disclosure.

Step 505 involves monitoring the geographic location of the cargo carrier 110 as the cargo carrier 110 travels towards and along a route. As discussed above, this may involve the auction server 120 receiving geographic information from the geographic sensor 112 of cargo carrier 110.

At step 510, the auction server 120 may partition the route into a plurality of route segments, with each route segment comprising a segment start point and a segment end point. Referring again to FIG. 6A, shown there is an example depiction of a route between a route starting point ('Washington') and destination point ('Boston') having been partitioned using multiple intermediate points along the route ('Philadelphia' and 'New York'). The auction server 120 may be configured to sell the available cargo capacity in the cargo carrier 110 for any route segment of this overall route, including route segments that overlap with each other. That is, cargo capacity can be sold for cargo to be picked up in 'Washington' and delivered to any one of 'Philadelphia', 'New York' or 'Boston'. Similarly, cargo capacity can be sold such that the cargo is to be picked up in 'Philadelphia' and delivered to either 'New York' or 'Boston'. Also, cargo capacity for cargo to be picked up in 'New York' and delivery to 'Boston' may also be potentially be sold. In this manner, it may be possible for at least two of the plurality of route segments to share a common segment start point, and/or at least two of the plurality of route segments share a common segment end point.

At step 515, for at least two route segments of the plurality of route segments, the auction server 120 may determine a segment starting distance between the geographic location of the cargo carrier 110 and the segment start point of the route segment. As illustrated in FIG. 6A, a segment starting distance 610a for any route segment starting from 'Washington' would be '50 km'. However, the auction server 120 may also be configured to determine that the segment starting distance to any route starting from 'Philadelphia' would be '270 km' ('50 km'+'220 km'), and that the segment starting distance to any route starting from 'New York' to be '420 km' ('50 km'+'220 km'+'150 km'). As will be understood, the segment starting distance for any route segment may be updated as the cargo carrier 110 travels along the route towards the various segment start points.

At step 520, for the route segments to be auctioned off, the auction server 120 may begin a segment electronic auction to sell available cargo capacity prior to the cargo carrier 110 arriving at the segment start point of the route segment. During the electronic auction, the segment electronic auction sells the available cargo capacity on the route segment at a current segment price that corresponds to the segment starting distance. Similar to an electronic auction for the a route described above with respect to FIGS. 2-4, the current segment price for a segment electronic auction may generally decrease as the segment starting distance between the geographic location of the cargo carrier 110 and the segment start point of the route segment decreases.

Figure 7:
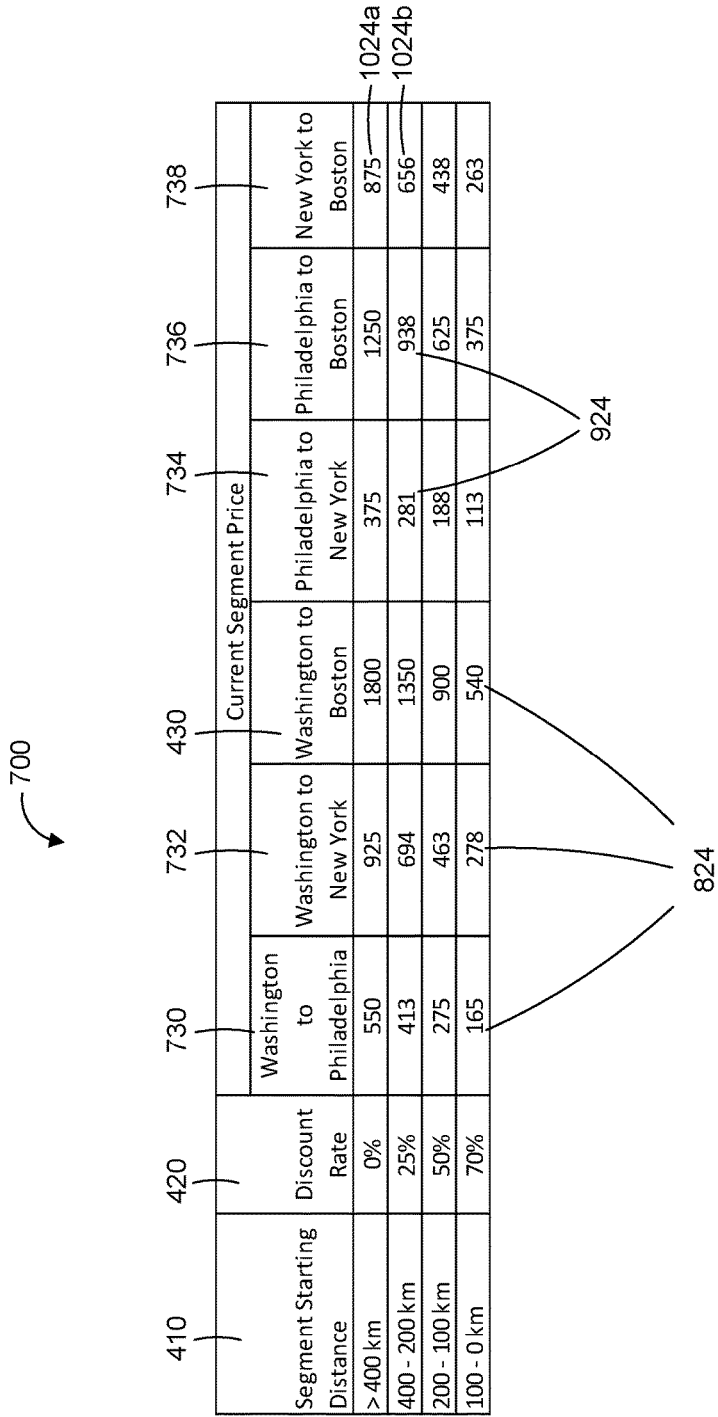
FIG. 7 is an example table showing, for a plurality of route segments, a distance that a cargo carrier needs to travel to each segment starting point, and corresponding current segment prices.

Referring briefly to FIG. 7, shown there is a table of example values similar to that which is shown in FIG. 4, except that in FIG. 7, prices for purchasing cargo capacity on the various route segments are illustrated. Specifically, in addition to the current route price from 'Washington to Boston' 430 shown in FIG. 4 (which may also be considered as a route segment in table 700), additional route segments for 'Washington to Philadelphia' 730, 'Washington to New York' 732, 'Philadelphia to New York' 734, 'Philadelphia to Boston' 736 and 'New York to Boston' 738 are also shown. As with the table shown in FIG. 4, a current segment price for each respective route segment may decrease according to a discount rate 420 that increases as the segment starting distance decreases. As illustrated, the ranges 410 for segment starting distance and the corresponding discount rate to be applied 420 are the same as that which is shown in FIG. 4. However, as with the relationship between a current route price and a route discussed above, it will be understood that other configurations of decreasing a current segment price according to a segment starting distance may also be possible.

To illustrate how the electronic auctions for the route segments of a route may be conducted, reference will now be made to FIGS. 8A, 9A, and 10A that show generally as 800, 900, and 1000 respectively, user interfaces that may be presented on a bid computing device 130 when the electronic auctions are running on auction server 120. As illustrated, the user interface is provided in the form of a website accessible through a browser on the bid computing device 130. However, it will be understood that other methods of presenting bid auction information on the bid computing device 130 (e.g., through a dedicated native application) may also be possible.

Figure 8A:
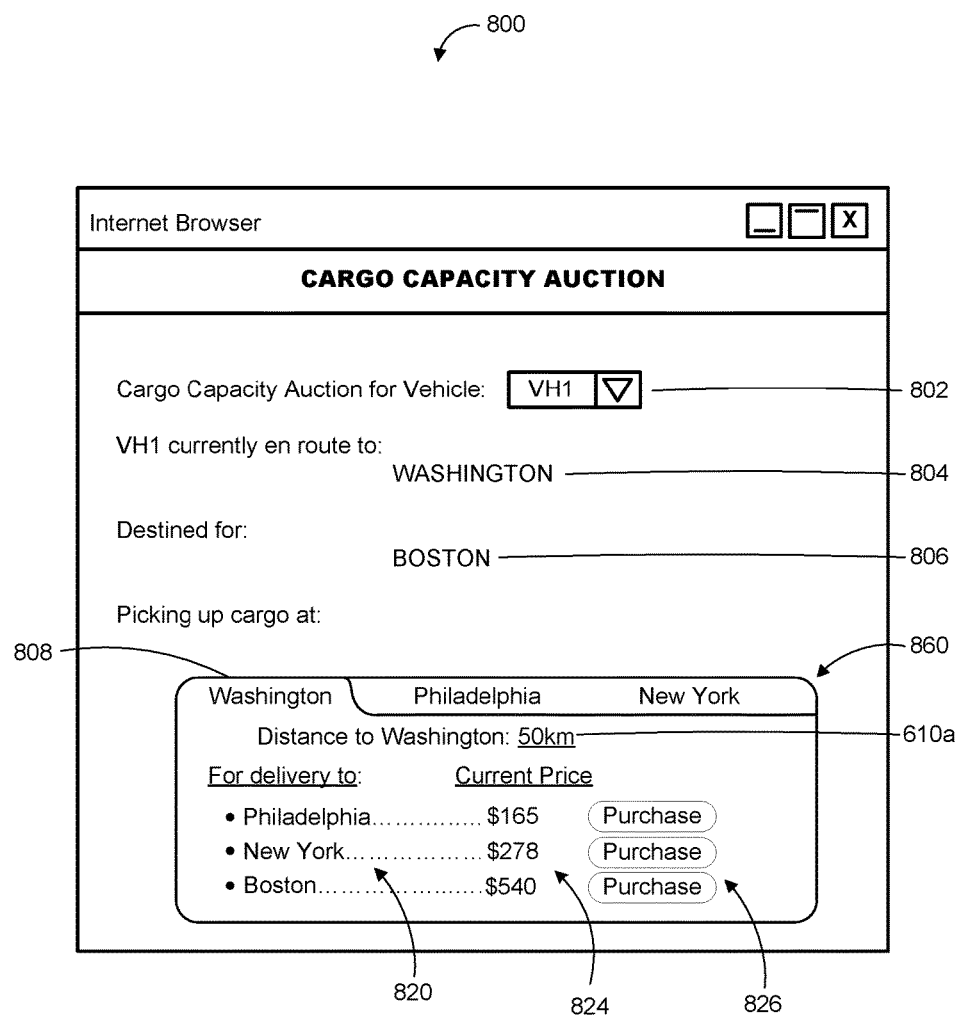
FIGS. 8A, 9A, and 10A are example user interfaces that, at time 'A' shown in FIG. 6A, allow purchasing of available cargo capacity for a plurality of route segments.
Figure 9A:
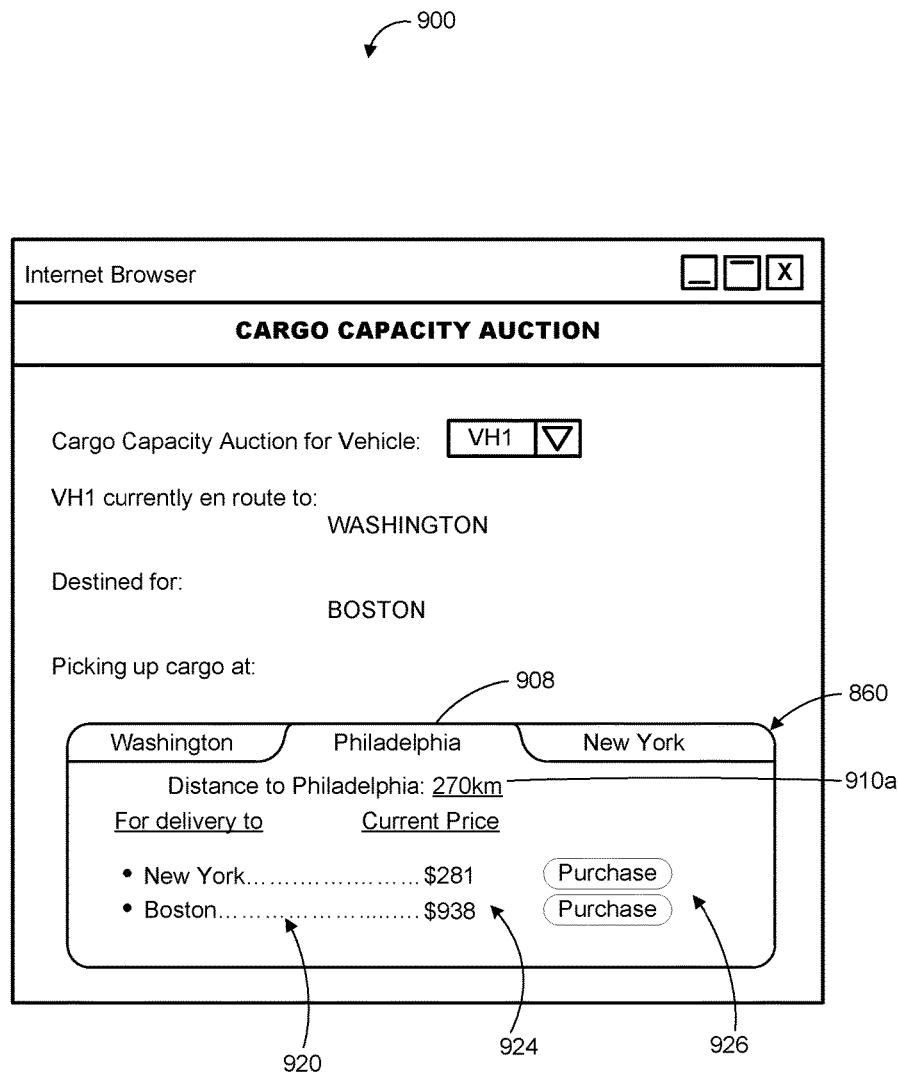
Figure 10A:
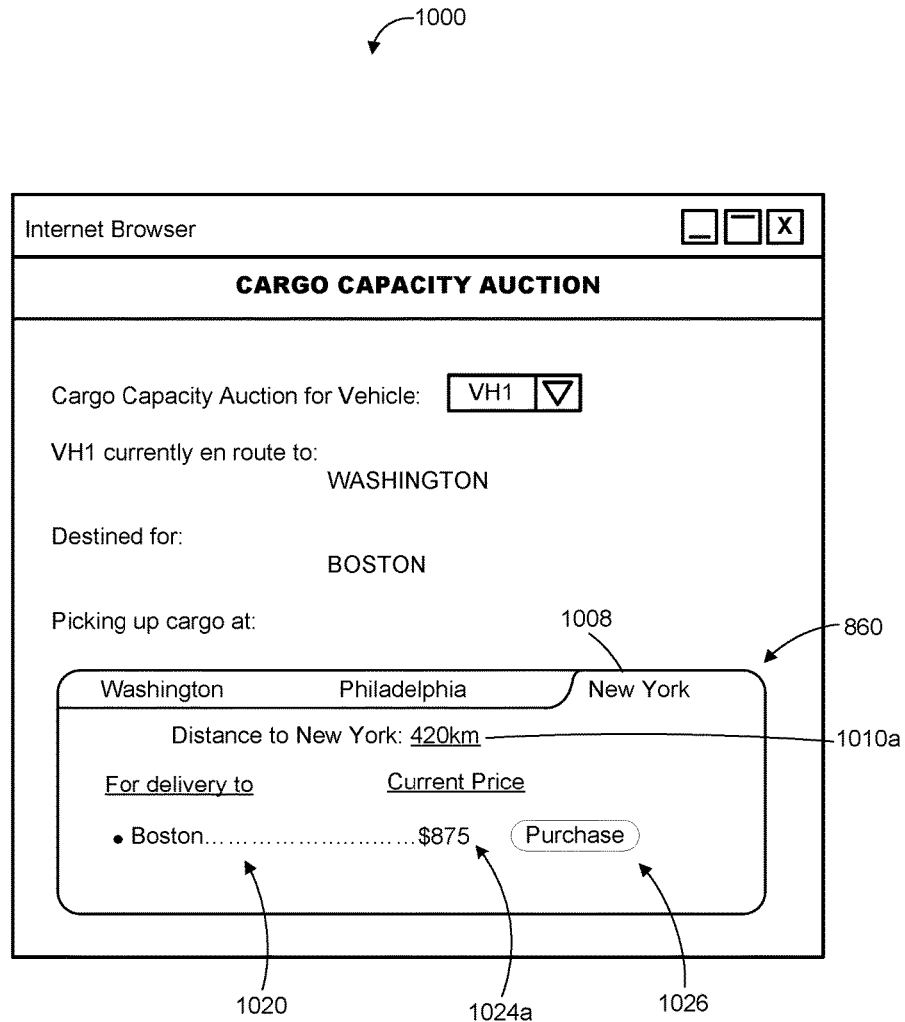

FIGS. 8A, 9A and 10A illustrate options that may be presented to a potential participant in the electronic auction during the time 'A' shown in FIG. 6A. Referring briefly to FIG. 6A, at time 'A', a cargo carrier 110 with available cargo capacity is travelling towards the starting point of a route ('Washington') that has been partitioned into a plurality of route segments. As shown, there is a segment starting distance 610a of '50 km' before the cargo carrier 110 reaches the segment starting point for route segments that start at 'Washington'.

Referring first to FIG. 8A, the user interface may provide a user control 802 (illustrated as a combo box) that allows for the selection of a cargo carrier 110 that has available cargo capacity. Once selected, the user interface may show the next available route segment starting point 804 ('Washington'), as well as the eventual destination point 806 ('Boston'), for the cargo carrier 110. The user interface may also include a segment start point control 860 that allows a potential purchaser to select where they would like their cargo to be picked up from. As illustrated, the segment start point control 860 is illustrated as a tab control that provides a segment start point on each tab. Tab 808 is selected in the illustrated example, and it shows the segment starting distance 610a of '50 km', as well as the various potential segment endpoints 820 for the route segment having a starting point at 'Washington'. For each of the various segment endpoints 820 of 'Philadelphia', 'New York' and 'Boston, corresponding current segment prices 824 of '$165', '$278' and '$540' are shown respectively. Controls 826 (illustrated as buttons) allowing users to purchase cargo capacity for a given route segment are also shown.

Referring back to FIG. 7, it can be seen that the current segment prices shown in the user interface in FIG. 8A can be determined from the table shown in FIG. 7. That is, the current segment prices 824 may be generated by looking up the appropriate segment starting distance 610a of '50 km' within the particular route segment column for each of the 'Washington to Philadelphia' 730, 'Washington to New York' 732, and 'Washington to Boston' 430 route segments. Since a segment starting distance of 610a of '50 km' would fall within the '100-0 km' segment starting distance range 410, this would mean that a discount rate of '70%' would be identified in the discount rate column 420, and that the current segment prices 824 would be arrived at.

Referring to FIG. 9A, shown there generally as 900 is a user interface similar to that which is shown in FIG. 8A, except that the segment start point control 860 is shown with tab 908 selected to present route segments with a segment starting point at 'Philadelphia'. As illustrated, the segment starting distance 910a between a current location of the cargo carrier 110 and the segment start point of 'Philadelphia' is shown as '270 km' ('50 km'+'220 km', as shown in FIG. 6A). Also, the potential segment endpoints 920 of 'New York' and 'Boston' are shown, with corresponding current segment prices 924 for each respective route segment. Referring again to FIG. 7, as the route starting distance 910a of '270 km' falls within the segment starting distance range 410 of '400-200 km', the current segment prices 924 of '$281' and '$938' are selected in the 'Philadelphia to New York' 734 and 'Philadelphia to Boston' 736 columns of the table 700 shown in FIG. 7. These current segment prices 924 are then reflected in the example user interface shown in FIG. 9A. Similar to FIG. 9A, controls 926 may be provided to allow users to purchase the available cargo capacity for a given route segment.

Referring to FIG. 10A, shown there generally as 1000 is an example user interface similar to that which is shown in FIGS. 8A and 9A, except that tab 1008 of the segment start point control 860 is selected to present route segments with a segment starting point at 'New York'. A segment starting distance 1010a of '420 km' is correspondingly illustrated ('50 km'+'220 km'+'150 km', as shown in FIG. 6A), as is a potential segment endpoint 1020 of 'Boston'. Referring again to FIG. 7, since the segment starting distance 1010a of '420 km' to 'New York' is greater than '400 km', it falls within the '>400 km' range in table 700. Accordingly, the current segment price 1024a of '$875' is shown in FIG. 10A. Control 1026 is also provided to allow purchase of cargo capacity for the 'New York to Boston' route segment.

Referring again to FIG. 5, at step 525, the auction server 120 may receive input indicating that cargo capacity for a first route segment of the plurality of route segments has been sold via a first segment electronic auction. For example, this may include an auction server 120 receiving input from a bid computing device 130 that indicates a purchase of available cargo capacity for a route segment at a current segment price. This may be performed when, for example, a user interacts with any of the user interfaces shown in FIG. 8A, 9A, or 10A.

Continuing with the example above, at time 'B' subsequent to time 'A', a user of the bid computing device 130 may interact with the user interface shown in FIG. 9A to purchase the cargo capacity for the 'Philadelphia to New York' route segment.

Figure 6B:
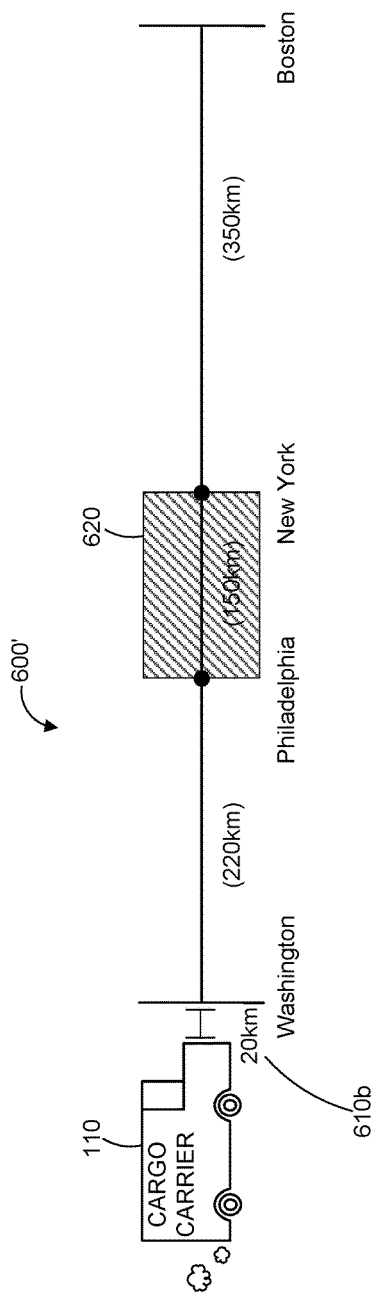
FIG. 6B is an example depiction, at a second point in time 'B', of a cargo carrier as it travels towards the starting point of a route that has been partitioned into a plurality of route segments, after cargo capacity for one route segment of the plurality of route segments has been purchased.

Referring to FIG. 6B, shown there generally as 600' is an example depiction, at time 'B', of a cargo carrier as it travels towards the starting point of a route, after one route segment of the plurality of route segments has been purchased. At time 'B', the cargo carrier 110 has traveled another '30 km' towards its eventual destination point of 'Boston', such that the segment starting distance 610b to the closest segment starting point ('Washington') has decreased to '20 km'. Also, the available cargo capacity on the cargo carrier 110 for the 'Philadelphia to New York' route segment has been purchased—this is illustrated in FIG. 6B with a box 620 with cross-hatch shading covering the 'Philadelphia to New York' portion of the route.

Once a route segment has been purchased, it may be the case that some of the other electronic auctions that are simultaneously being run may be affected. For example, if two route segments have overlapping portions, the sale of cargo capacity for one of the two route segments would prevent the cargo carrier 110 from transporting goods (of the same volume) for another potential purchaser for the overlapped route segment. As such, the cargo capacity can no longer be sold for the second of the two overlapping route segments. To assist with identifying the other concurrent electronic auctions that may be impacted, the method may proceed to step 530 of FIG. 5.

Referring again to FIG. 5, at step 530, the method involves identifying a second route segment comprising the first route segment, and a second segment electronic auction selling cargo capacity for the second route segment. For example, this may involve the auction server 120 analyzing the route segments to determine any other route segment that may geographically contain the route segment for which cargo capacity has been purchased. In various embodiments, this analysis may be pre-determined prior to the beginning of the electronic auctions for the route segments. Additionally or alternatively, this analysis may be dynamically determined once cargo capacity for a given route segment has been purchased. Once these second route segments that include sold a route segment have been identified, corresponding segment electronic auctions for that route segment may then also be identified.

In the example scenario, the auction server 120 may determine that any route segment including the 'Philadelphia to New York' route segment to be such second route segments that need to be identified. Referring again to FIG. 6B, it can be seen that the route segments of 'Washington to New York', 'Washington to Boston' and 'Philadelphia to Boston' may not be able to be sold anymore, so that these routes segments can be identified as the second route segments.

In various embodiments, once the second segment electronic auctions for these second route segments have been identified, they may be recalibrated to only sell cargo capacity for remaining unsold portions not included in the route segment that has already been sold. During recalibration, the auction server 120 may end the second segment electronic auction, and begin new electronic auctions for the remaining unsold portions of the second route segment that includes route segments that have already been sold. Alternatively, if the auction server 120 is already running electronic auctions for the remaining unsold portions (as is the case in the described example scenario), the auction server 120 may simply end the identified second segment electronic auction that contains sold route segments.

Figure 8B:
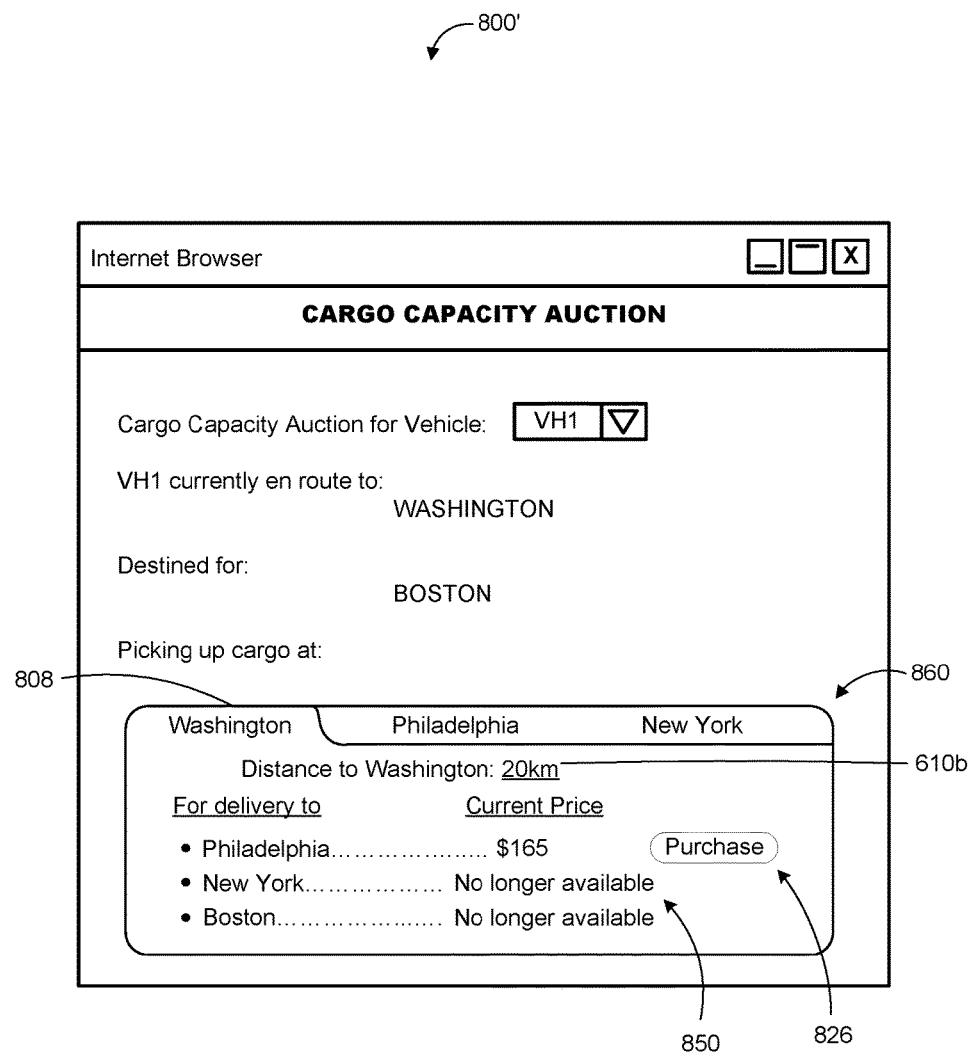
FIGS. 8B, 9B, and 10B are example user interfaces that, at time 'B' shown in FIG. 6B after cargo capacity for one route segment has been purchased, allow purchasing of available cargo capacity for a plurality or route segments.
Figure 9B:
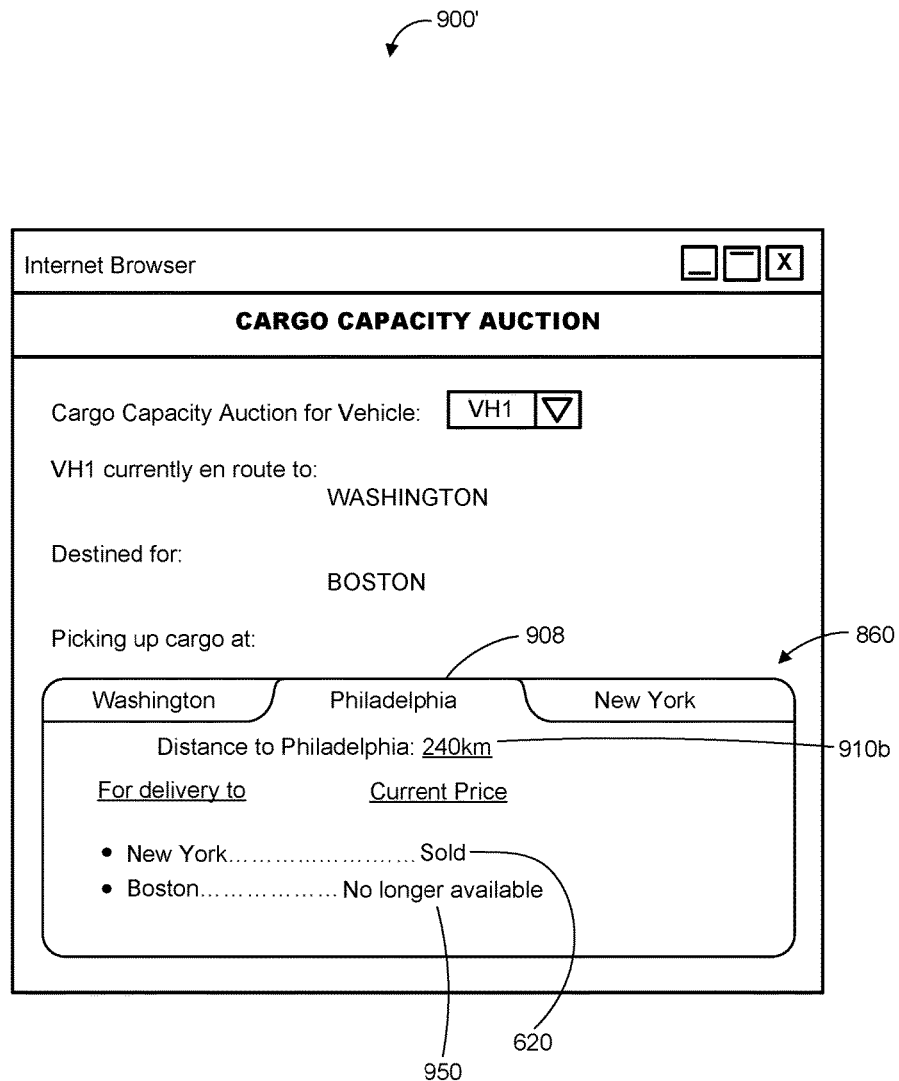
Figure 10B:
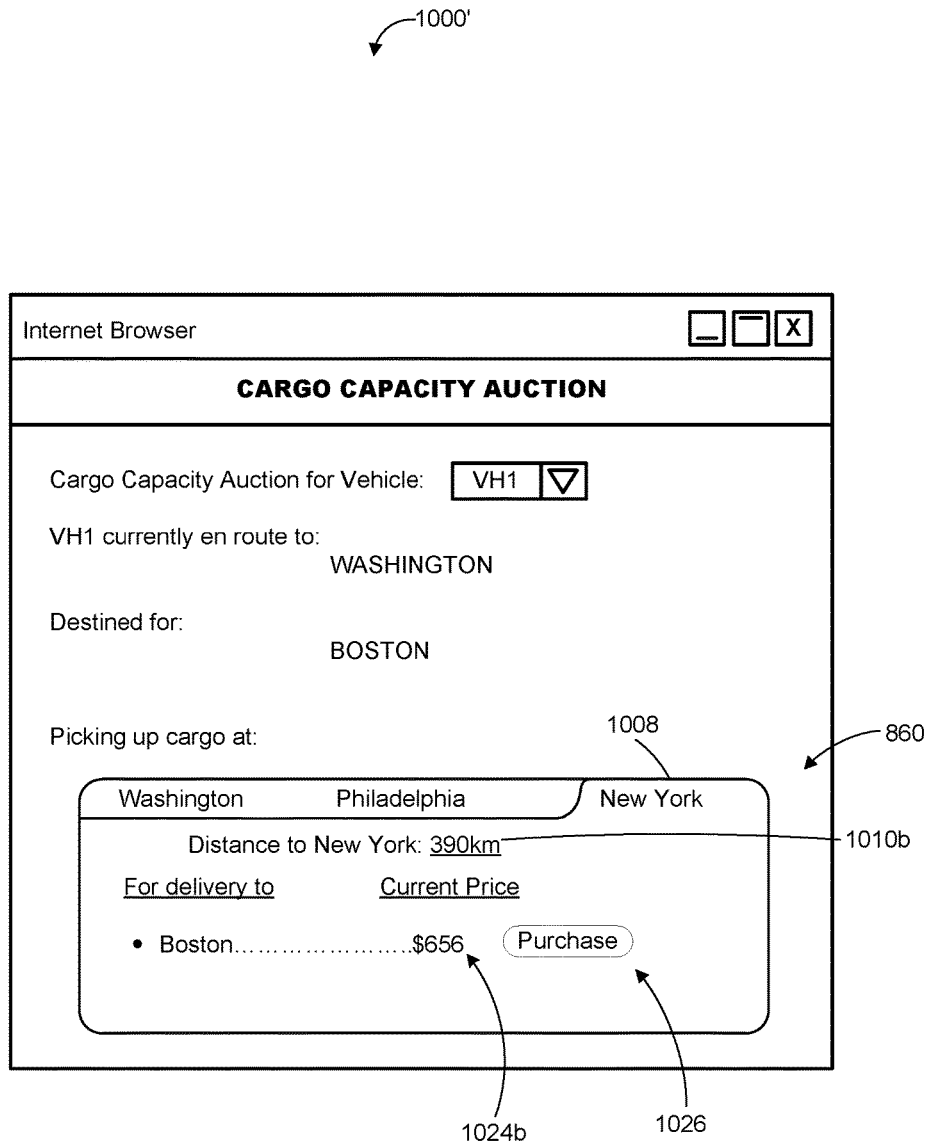

FIGS. 8B, 9B, and 10B are example user interfaces that illustrate how the various respective user interfaces shown earlier in FIGS. 8A, 9A, and 10A may be updated at time 'B', after the purchase of cargo capacity for the 'Philadelphia to New York' route segment.

Referring to FIG. 8B, shown there generally as 800' is an example user interface similar to that which is shown in FIG. 8A. For example, as can be seen, the segment start control 860 has tab 808 selected showing route segments having a segment starting point at 'Washington'. At time 'B', the segment starting distance 610b has been updated to show '20 km', reflecting that the cargo carrier 110 has traveled '30 km' towards its eventual destination of 'Boston'. However, as compared to the user interface shown in FIG. 8A, it can be seen that the auction server 120 has ended the segment electronic auctions for the 'Washington to New York' and 'Washing to 'Boston' route segments. Specifically, prices for these route segments have been replaced with indicators 850 that specify that those route segments are 'No longer available'. The electronic auction for the 'Washington to Philadelphia' route segment remains available, and a control 826 that allows purchase of cargo capacity for that route segment remains.

Similarly, referring to FIG. 9B, shown there generally as 900' is an example user interface similar to that which is shown in FIG. 9A. As can be seen, the segment start control 860 has tab 908 selected to show route segments having a segment starting point at 'Philadelphia'. Similar to FIG. 8B, at time 'B', the segment starting distance 910b has been decreased by '30 km' to show that the cargo carrier 110 is now '240 km' away from 'Philadelphia'. Also, since the 'Philadelphia to New York' route segment has been purchased, a corresponding indicator 620 is provided to show that cargo capacity for that route segment has already been 'Sold'. As the 'Philadelphia to New York' route segment has been purchased, cargo capacity for the 'Philadelphia to Boston' route segment can no longer be sold. As a result, the 'Philadelphia to Boston' route segment is also updated with an indicator 950 that states that cargo capacity for that route segment is 'No longer available'.

Referring to FIG. 10B, shown there is generally as 1000' is an example user interface similar to that which is shown in FIG. 10A. The segment start control 860 has tab 1008 selected to show route segments having a segment starting point at 'New York'. As illustrated, the purchase of the cargo capacity for the 'Philadelphia to New York' route segment has not impacted the availability of the 'New York to Boston' route segment because there is still available cargo capacity for this route segment. Accordingly, a control 1026 that allows purchase of the cargo capacity for that route segment is still available.

Also, the segment starting 1010b has been updated at time 'C' to show that the cargo carrier 110 is '30 km' closer to 'New York'. As the segment starting distance has decreased to '390 km', a new current segment price of '$656' is now shown. That is, referring back to FIG. 7, it can be seen that the decrease in the segment starting distance 1010b, has caused the segment starting distance to cross into a new segment starting distance range 410. Accordingly, a new discount rate 420 of '25%' is applied, and a new segment starting price is generated and displayed for the 'New York to Boston' route segment.

Referring again to FIG. 5, at step 540, the auction server 120 may determine that the cargo carrier 110 has traveled past the segment start point of a route segment associated with the at least one segment auction. In this scenario, the auction server 120 may then end such at least one segment electronic auction (step 545). It will be understood that although steps 540 and 545 are illustrated in FIG. 5 as being after steps 525-535, that the steps recited in FIG. 5 are not required to be performed in any particular order. In particular, it may be possible that a cargo carrier 110 travels past a segment start point before a purchase of cargo capacity for any route segment is made.

Figure 6C:
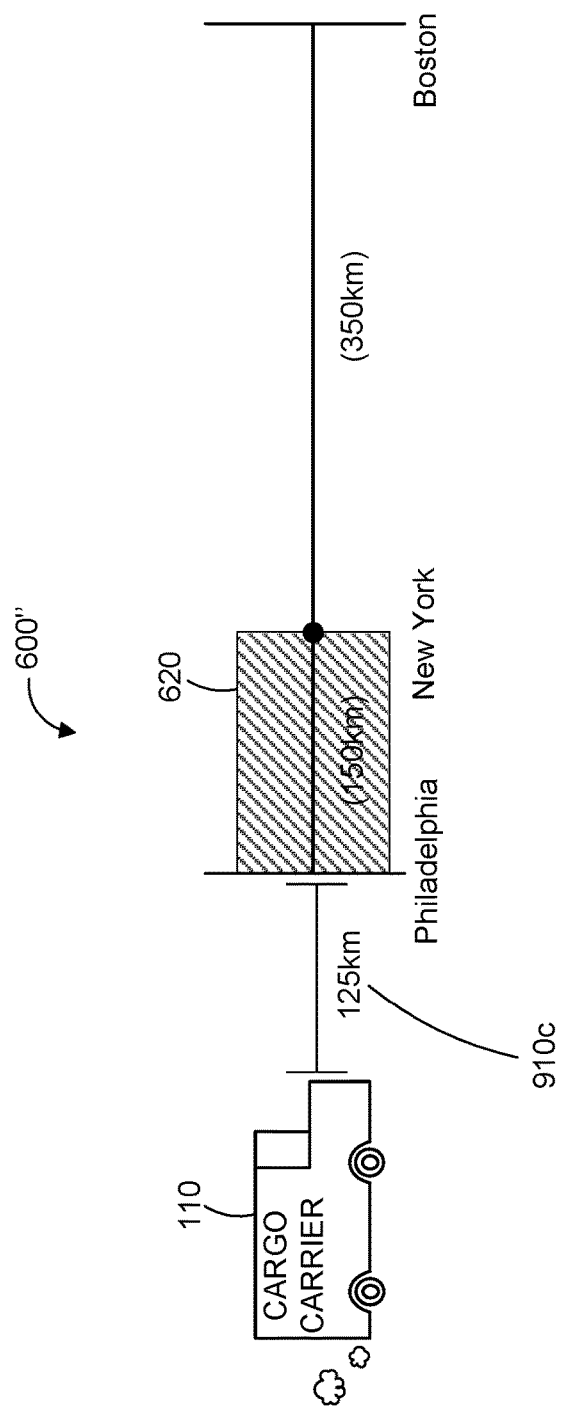
FIG. 6C is an example depiction, at a third point in time 'C', of a cargo carrier as it travels towards a subsequent segment starting point, after the cargo carrier has traveled passed a segment start point for one of the route segments.

Referring to FIG. 6C, shown there generally as 600", is an example depiction of a cargo carrier 110 as it travels towards a subsequent segment starting point, after the cargo carrier has traveled passed a segment start point for one of the route segments. Continuing on with the example scenario, at time 'C', the cargo carrier 110 has traveled past the segment starting point at 'Washington' without any purchase of available cargo capacity for route segments starting at 'Washington'. As illustrated, a segment starting distance 910c ('125 km') to the next segment starting point ('Philadelphia') is shown. As well, the 'Philadelphia to New York' route segment continues to be shown with a box 620 with cross-hatch shading to indicate that cargo capacity for that route segment has already been purchased earlier.

Figure 9C:
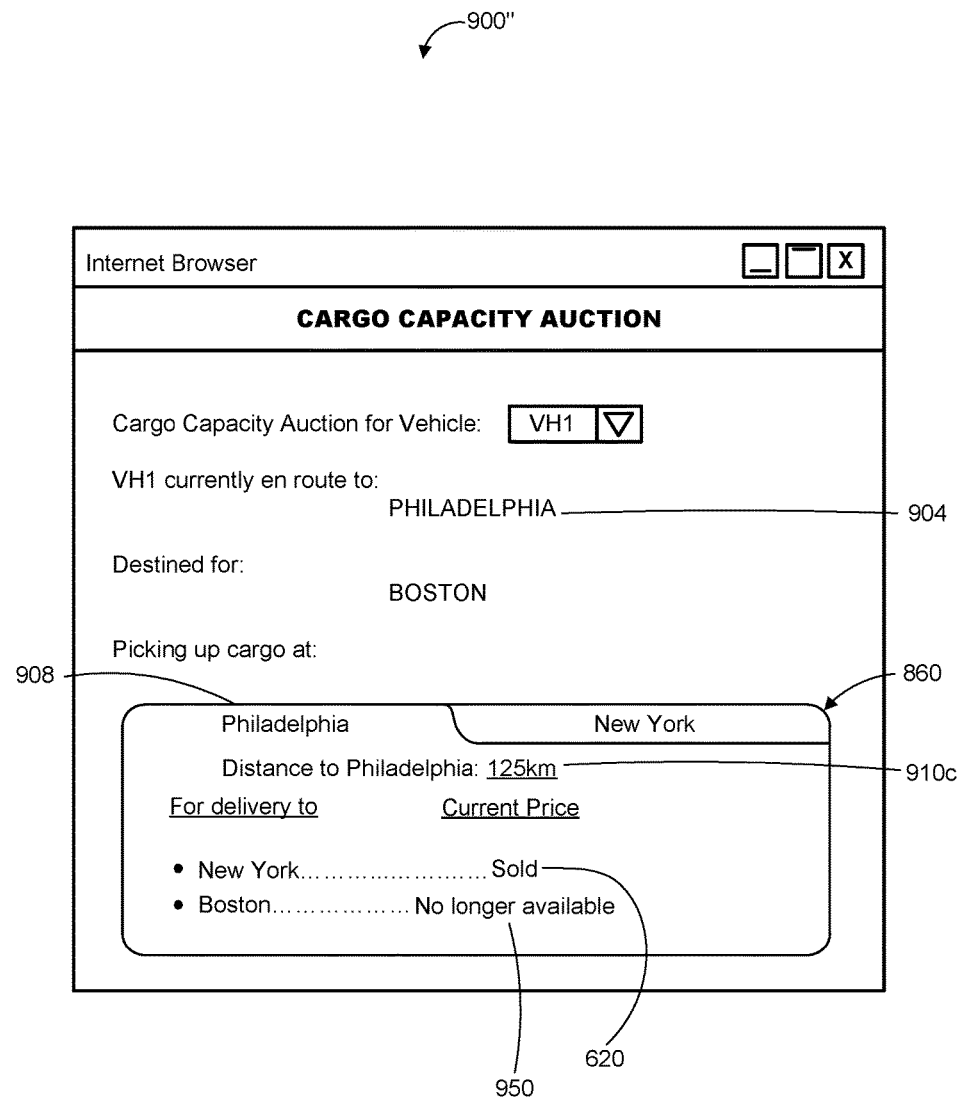
FIGS. 9C and 10C are example user interfaces that, at time 'C' shown in FIG. 6C after the cargo carrier has traveled past a segment start point for one of the route segments, allow purchasing of available cargo capacity for a plurality of route segments.
Figure 10C:
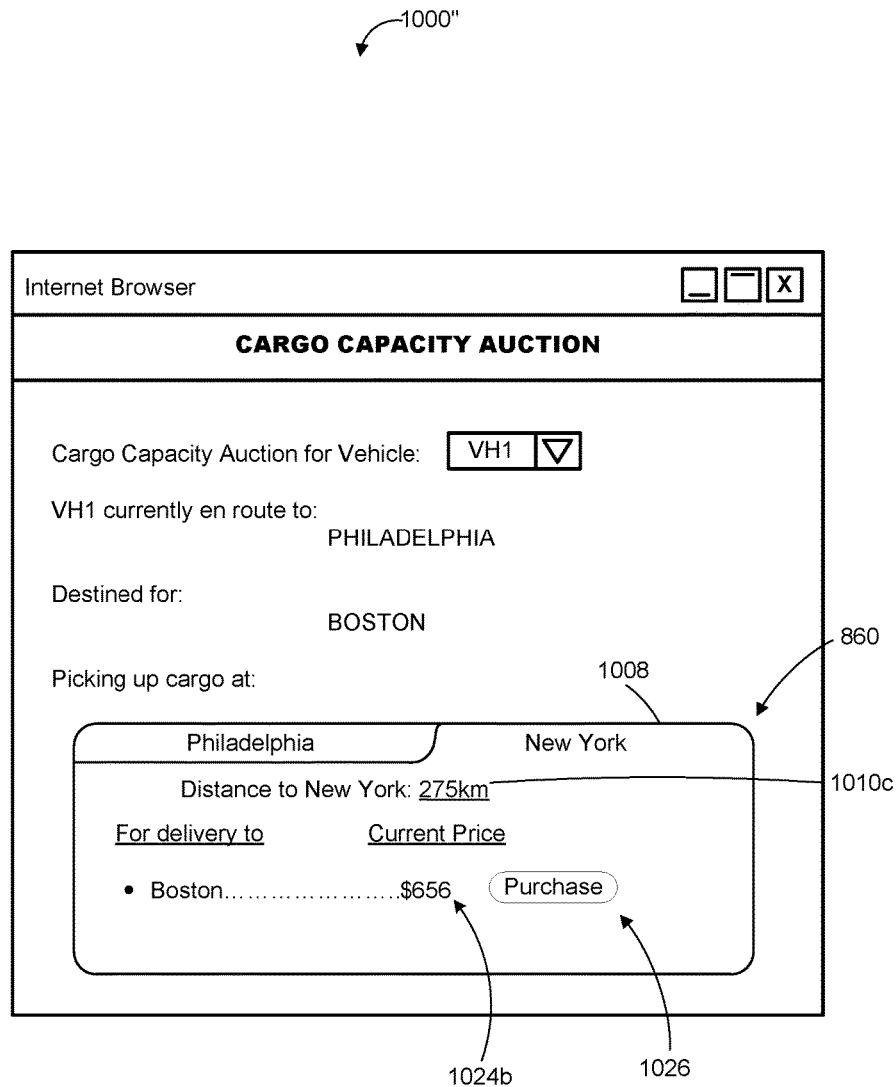

FIGS. 9C and 10C are example user interfaces that show how the user interfaces of FIGS. 9B and 10B may be updated at time 'C', after the cargo carrier 110 has traveled past a segment start point for one of the route segments.

Referring to FIG. 9C, shown there generally as 900" is an example user interface similar to that which is shown in FIG. 9B, except that since the cargo carrier 110 has traveled past the segment starting point for 'Washington', the field to show the next available segment starting point 904 has been updated to show 'Philadelphia'. Also, since the auction server 120 has ended the segment electronic auctions for route segments having a start point at 'Washington' because they can no longer be sold, the segment start point control 860 has been correspondingly updated to remove the 'Washington' tab. As illustrated, only two tabs for selecting a segment start point remain, and tab 908c is selected. On this tab 908, the segment starting distance 910c has been updated to indicate that the distance to 'Philadelphia' is '125 km' away. As well, the indicator 620 indicating that the cargo capacity for the 'Philadelphia to New York' route has been sold, and the indicator 950 to indicate that the route segment from 'Philadelphia to Boston' is no longer available remains on the user interface 900".

Referring to FIG. 10C, shown there generally as 1000" is an example user interface similar to that which is shown in FIG. 9C, except that it is tab 1008 for route segments having segment starting points at 'New York' that is selected. As in FIG. 9C, at time 'C', the cargo carrier 110 has travelled past the segment start point at 'Washington', so that the segment start point control 860 only contains two tabs (the 'Washington' tab having been removed). As illustrated the segment starting distance 1010c has been updated to indicate that the cargo carrier 110 is '275 km' away from 'New York' ('125 km'+'150 km', as shown in FIG. 6C). Since the segment starting distance has not decreased so as to fall within a new starting distance range 410 of table 700 in FIG. 7, the current segment price 1024b for cargo capacity on the 'New York to Boston' route segment remains unchanged from FIG. 10B at '$656'. A user may decide to purchase the cargo capacity for this route at the current segment price by activating control 1026.

In various embodiments, other additional factors may also influence a current route price or current segment price as the electronic auction for the cargo capacity runs. For example, the current route price or the current segment price may be varied based on one or more additional price factors.

A price factor may include information concerning the market prices of cargo capacity for a given geographical region. In such embodiments, the starting original price in an electronic auction for cargo capacity in that geographical region may be determined according to historical market prices for similar cargo capacity on similar routes, for example.

Additionally or alternatively, the price factors may also include various costs associated with the operation of the cargo carrier 110 when transporting the cargo. Such costs may include, for example, the current price of fuel, toll costs, a capability of the cargo carrier (e.g., if the cargo carrier provides a refrigerated holding area that requires more energy to operate), and/or a cargo type (e.g., if the cargo to be transported is particularly heavy, and additional fuel is necessary to transport cargo). One or more of these costs may be factored into a current route price or current segment price.

A further price factor may include real-time traffic information and/or road condition information. From this information, the auction server 120 may be able to predict, with greater accuracy, the amount of time that the cargo carrier 110 will take to arrive at a route starting point or segment starting point. For example, if the traffic information indicates there are large amounts of traffic along the route starting distance or segment starting distance, and/or if the road condition information indicates that the road conditions are particularly icy or wet, the auction server 120 may determine that more time may be required for the cargo carrier 110 to traverse the route starting distance or segment starting distance. As a result, the auction server 120 may, for example, add a premium to a current route price or current segment price to take advantage of potential additional purchasers who might purchase during the additional estimated time until arrival of the cargo carrier 110 at the starting point.

Conversely, if the traffic information indicates there is little traffic along the route starting distance or segment starting distance, and/or if the road condition information indicates that road conditions are normal, the auction server 120 may determine that the cargo carrier 110 may arrive at the starting point sooner than expected. As a result, the auction server 120 may, for example, apply a further discount (separate from any discount related to the route or segment starting distance discussed above) to the current route price or current segment price. This further discount may increase the likelihood of a purchase being made in the shorter than expected period of time before the cargo carrier 110 arrives at the starting point.

As noted, in various embodiments, the cargo carrier 110 may not be provided with a cargo availability sensor 114. In these embodiments, the available cargo capacity to be auctioned off may be calculated based on other data inputs provided to the auction server 120. For example, when a cargo carrier 110 first departs from an originating point, an operator of the cargo carrier 110 may enter the volume of available cargo capacity in the cargo carrier 110 into the mobile computing module provided at the cargo carrier 110. This data may then be transmitted to the auction server 120 so that the available cargo capacity can be auctioned off in electronic auctions, as described above. When presenting a user interface for the electronic auctions at the bid computing device 130, the user interface may then provide an option for a purchaser to indicate the volume of cargo they are transporting (which may be up to the maximum volume of cargo capacity that is available).

The auction server 120 may then calculate the remaining available volume of cargo capacity that can still be auctioned off, and then reconfigure electronic auctions to only auction off the available volume of cargo capacity that remains. In various embodiments, the remaining volume of cargo capacity may potentially even be for the same route segment or route for which the available cargo capacity was purchased. If the volume entered by a user is incorrect when the cargo carrier 110 arrives to pick up the cargo, the mobile computing module may be configured to receive a corrected volume from the operator of the cargo carrier 110 so that the volume of available cargo capacity to be auctioned off can correspondingly be updated.

This type of updating may also be performed when cargo is dropped off. For example, when dropping off cargo at a route end point or a segment end point, the mobile computing module may be configured to receive input identifying a volume of cargo unloaded at a stop of the cargo carrier prior to the starting point of a subsequent route or route segment. The auction server 120 may then be configured to update the volume of cargo capacity available in the various electronic auctions being run accordingly.

The present invention has been described here by way of example only. Various modification and variations may be made to these exemplary embodiments without departing from the spirit and scope of the invention, which is limited only by the appended claims.

For example, the steps of a method in accordance with any of the embodiments described herein may be performed in any order, whether or not such steps are described in the claims, figures or otherwise in any sequential numbered or lettered manner. Also, in the various user interfaces illustrated in the figures, it will be understood that the layout of the user interface are provided as examples only and are not meant to be limiting. Other suitable user interface configurations may be possible.

We claim:

1. A method of conducting an electronic auction at an auction server for available cargo capacity on a cargo carrier having a holding area, the auction server comprising a processor and a memory storing instructions executable by the processor, the method comprising:
   determining the available cargo capacity within the holding area using a cargo availability sensor provided within the holding area;
   transmitting, by the cargo availability sensor, the determined available cargo capacity on the cargo carrier to the auction server;
   prior to the cargo carrier arriving at a starting point of a route and when the cargo carrier is at an initial location, operating the auction server to activate the electronic auction to make the available cargo capacity available for purchase at a current route price;
   tracking, by a geolocation sensor, a location of the cargo carrier as the cargo carrier travels towards the starting point of the route from the initial location; and
   operating the processor to vary the current route price by:
      decreasing the current route price as the location of the cargo carrier approaches the starting point of the route; and
      varying the current route price in response to a capacity change detected by the cargo availability sensor.

2. The method of claim 1, wherein tracking the current location of the cargo carrier as the cargo carrier travels towards the starting point of the route comprises:
   partitioning the route into a plurality of route segments, each route segment comprising a segment start point and a segment end point; and
   for at least two route segments of the plurality of route segments,
      determining a segment starting distance between the location of the cargo carrier and the segment start point of the route segment, and
      prior to the cargo carrier arriving at the segment start point of the route segment, operating the auction server to activate a segment electronic auction for the available cargo capacity determined by the cargo availability sensor, wherein the segment electronic auction makes available the volume of available cargo capacity on the route segment at a current segment price that corresponds to the segment starting distance.

3. The method of claim 2 comprising, for at least one of the segment electronic auctions, receiving input to purchase at least a portion of the available cargo capacity for the route segment at the current segment price.

4. The method of claim 2, wherein, for the at least two route segments, the respective current segment prices are repeatedly updated such that the current segment prices (i) vary according to the available cargo capacity on the cargo carrier and (ii) decrease as the respective segment starting distances between the location of the cargo carrier and the respective segment start points of the route segments decrease.

5. The method of claim 2, wherein, for at least one of the segment electronic auctions, the method further comprises,
   determining that the cargo carrier has traveled past the segment start point of the route segment associated with the at least one segment auction; and operating the auction server to end the at least one segment electronic auction.

6. The method of claim 2 comprising:
receiving input indicating that cargo capacity for a first route segment of the plurality of route segments has been sold via a first segment electronic auction;
identifying a second route segment that contains the first route segment;
identifying a second segment electronic auction making available cargo capacity for the second route segment; and
operating the auction server to end the second segment electronic auction.

7. The method of claim 6, further comprising:
operating the auction server to recalibrate the second segment electronic auction to remove the cargo capacity sold for the first route segment from being available for purchase.

8. The method of claim 2, wherein at least two route segments of the plurality of route segments overlap.

9. The method of claim 2, wherein at least two route segments of the plurality of route segments share a common segment start point.

10. The method of claim 2, wherein at least two route segments of the plurality of route segments share a common segment end point.

11. The method of claim 1, wherein the cargo availability sensor operates to detect a distance to one of (i) a wall of the holding area and (ii) a closest cargo object for estimating the available cargo capacity.

12. An auction system for conducting an electronic auction for available cargo capacity on a cargo carrier having a holding area, the auction system comprising:
a cargo availability sensor within the holding area of the cargo carrier;
a geolocation sensor operable to track a location of the cargo carrier;
a memory storing executable instructions;
a processor operable to execute the instructions stored on the memory to:
determine the available cargo capacity within the holding area using data collected by the cargo availability sensor;
prior to the cargo carrier arriving at a starting point of a route and when the cargo carrier is at an initial location, activate the electronic auction to make the available cargo capacity available for purchase at a current route price;
operate the geolocation sensor to track the location of the cargo carrier as the cargo carrier travels towards the starting point of the route from the initial location; and
vary the current route price by:
decreasing the current route price as the location of the cargo carrier approaches the starting point of the route; and
varying the current route price in response to a capacity change detected by the cargo availability sensor.

13. The auction system of claim 12, wherein the processor is operable to:
partition the route into a plurality of route segments, each route segment comprising a segment start point and a segment end point; and
for at least two route segments of the plurality of route segments,
determine a segment starting distance between the location of the cargo carrier and the segment start point of the route segment, and
prior to the cargo carrier arriving at the segment start point of the route segment, activating a segment electronic auction for the available cargo capacity determined by the cargo availability sensor, wherein the segment electronic auction makes available the available cargo capacity on the route segment at a current segment price that corresponds to the segment starting distance.

14. The auction system of claim 13, wherein, for at least one of the segment electronic auctions, the processor is operable to:
determine that the cargo carrier has traveled past the segment start point of the route segment associated with the at least one segment auction; and
end the at least one segment electronic auction.

15. The auction system of claim 13, wherein the processor is operable to:
receive input indicating that cargo capacity for a first route segment of the plurality of route segments has been sold via a first segment electronic auction;
identify a second route segment that contains the first route segment;
identify a second segment electronic auction that makes available cargo capacity for the second route segment; and
end the second segment electronic auction.

16. The auction system of claim 13, wherein at least two route segments of the plurality of route segments overlap.

17. The auction system of claim 13, wherein at least two route segments of the plurality of route segments share a common segment start point.

18. The auction system of claim 13, wherein at least two route segments of the plurality of route segments share a common segment end point.

19. The auction system of claim 12, wherein the cargo availability sensor operates to detect a distance to one of (i) a wall of the holding area and (ii) a closest cargo object for estimating the available cargo capacity.

20. The auction system of claim 12, wherein the processor is operable to:
generate a visual representation of a status of the electronic auction while the cargo carrier travels along the route for display at a computing device.

* * * * *